(12) United States Patent
Kontani (10) Patent No.: US 10,696,218 B1
(45) Date of Patent: Jun. 30, 2020

(54) ILLUMINATION DEVICE

(71) Applicant: PANASONIC INTELLECTUAL PROPERTY MANAGEMENT CO., LTD., Osaka (JP)

(72) Inventor: Masaki Kontani, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/572,956

(22) Filed: Sep. 17, 2019

(30) Foreign Application Priority Data

Dec. 20, 2018 (JP) .................................. 2018-238665
Apr. 23, 2019 (JP) .................................. 2019-081750

(51) Int. Cl.
  *B60Q 3/283* (2017.01)
  *F21V 7/00* (2006.01)
  *F21V 1/00* (2006.01)

(52) U.S. Cl.
  CPC ............... *B60Q 3/283* (2017.02); *F21V 1/00* (2013.01); *F21V 7/00* (2013.01)

(58) Field of Classification Search
  CPC ........................... B60Q 3/283; F21W 2106/00
  See application file for complete search history.

(56) References Cited

U.S. PATENT DOCUMENTS

| 2007/0159814 | A1* | 7/2007 | Jacobsson | E04F 15/02 362/153 |
| 2009/0056183 | A1* | 3/2009 | Reiland | G09F 13/22 40/564 |
| 2012/0206320 | A1* | 8/2012 | Lee | G07F 17/3202 345/4 |
| 2015/0307033 | A1* | 10/2015 | Preisler | B60R 13/02 362/488 |
| 2015/0375677 | A1* | 12/2015 | Salter | F21V 9/30 362/510 |
| 2016/0025281 | A1* | 1/2016 | Gardner | B62D 1/06 362/516 |

FOREIGN PATENT DOCUMENTS

| DE | 202012100538 U1 | * | 2/2013 | ............... B60Q 3/54 |
| GB | 2492100 A | * | 12/2012 | ............... B60Q 3/54 |
| JP | 2012-179801 A | | 9/2012 | |

* cited by examiner

*Primary Examiner* — Alexander K Garlen
(74) *Attorney, Agent, or Firm* — Greenblum & Bernstein, P.L.C.

(57) ABSTRACT

An illumination device includes: a light source; and a laminate that displays a predetermined design on a front surface by transmitting light emitted by the light source forward in a shape of the predetermined design. The laminate includes: a display layer that includes the front surface and is light transmissive; a reflective layer that includes a first opening having the shape of the predetermined design, is disposed between the display layer and the light source, and reflects external light transmitted from the front surface of the display layer rearward; a light blocking layer that includes a second opening having the shape of the predetermined design and overlapping the first opening, is disposed between the reflective layer and the light source, and blocks light; and a light diffusion layer that diffuses light and is disposed between the reflective layer and the light source to overlap the second opening.

15 Claims, 10 Drawing Sheets

ILLUMINATION DEVICE

CROSS REFERENCE TO RELATED APPLICATIONS

The present application is based on and claims priority of Japanese Patent Application No. 2018-238665 filed on Dec. 20, 2018 and Japanese Patent Application No. 2019-081750 filed on Apr. 23, 2019.

BACKGROUND

1. Technical Field

The present disclosure relates to an illumination device.

2. Description of the Related Art

Japanese Unexamined Patent Application Publication No. 2012-179801 discloses a translucent decorative material that does not show a color pattern on the surface side and the appearance of a woody decorative material is presented when there is no light from the backside, and when the light is applied from the backside, the color pattern together with wood grain appears on the surface.

SUMMARY

However, the technique disclosed in Japanese Unexamined Patent Application Publication No. 2012-179801 can be improved upon.

An illumination device according to one aspect of the present disclosure includes: a light source; and a laminate that displays a predetermined design on a front surface by transmitting light emitted by the light source forward in a shape of the predetermined design. The laminate includes: a display layer that includes the front surface and is light transmissive; a reflective layer that includes a first opening having the shape of the predetermined design, is disposed between the display layer and the light source, and reflects external light transmitted from the front surface of the display layer rearward; a light blocking layer that includes a second opening having the shape of the predetermined design and overlapping the first opening, is disposed between the reflective layer and the light source, and blocks light; and a light diffusion layer that diffuses light and is disposed between the reflective layer and the light source to overlap the second opening.

An illumination device according to one aspect of the present disclosure is capable of improving upon the above related art.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT (Underlying Knowledge Forming the Basis of the Disclosure)

In the illumination device having a conventional translucent decorative material disclosed in Japanese Unexamined Patent Application Publication No. 2012-179801, it is difficult to effectively balance masking a design such as a colored pattern when there is no light from the backside, and displaying the design when light is hit from the backside. Specifically, with the illumination device having the conventional translucent decorative material disclosed in Japanese Unexamined Patent Application Publication No. 2012-179801, the design displayed on the surface is displayed with light which has passed through a masking layer disposed on the backside of the translucent decorative material. Thus, the display luminance of the design decreases easily. On the other hand, when the light transmittance of the masking layer is adjusted so that the light easily transmits through the masking layer and the display luminance of the design does not decrease, the effect of masking the colored pattern decreases when there is no light. Accordingly, if the design is to be clearly displayed on the surface when the light source emits light, the design cannot be masked sufficiently when the light source does not emit light. If the design is to be sufficiently masked when the light source does not emit light, the design cannot be clearly displayed on the surface when the light source emits light. In other words, it is difficult to effectively balance masking and displaying of the design. In view of the above, the present disclosure provides an illumination device that is capable of effectively balancing masking and displaying the design.

An illumination device according to one aspect of the present disclosure includes: a light source; and a laminate that displays a predetermined design on a front surface by transmitting light emitted by the light source forward in a shape of the predetermined design. The laminate includes: a display layer that includes the front surface and is light transmissive; a reflective layer that includes a first opening having the shape of the predetermined design, is disposed between the display layer and the light source, and reflects external light transmitted from the front surface of the display layer rearward; a light blocking layer that includes a second opening having the shape of the predetermined design and overlapping the first opening, is disposed between the reflective layer and the light source, and blocks light; and a light diffusion layer that diffuses light and is disposed between the reflective layer and the light source to overlap the second opening.

With this, the reflective layer that reflects external light, and the light diffusion layer that diffuses light are provided separately, and the first opening disposed to overlap the light diffusion layer is provided on the reflective layer. Therefore, adjusting the reflectance of the reflective layer enables adjustment of the degree of masking the shape of the second opening on the light blocking layer appearing on the front surface of the display layer when the light source does not emit light. Furthermore, the display luminance of the predetermined design can be adjusted by adjusting the transmittance of the light diffusion layer. As described above, since the configurations of the reflective layer and the light diffusion layer are separate, the degree of masking the shape of the second opening and the display luminance of the predetermined design can be adjusted independently. Accordingly, masking and displaying the predetermined design can be balanced effectively.

Moreover, the reflective layer, the light blocking layer, and the light diffusion layer may be printed layers that are printed on a rear surface of the display layer in stated order.

Thus, the reflective layer, the light blocking layer, and the light diffusion layer can be easily disposed on the rear surface of display layer.

Moreover, the laminate may further include a transparent film, the display layer is disposed on a front surface of the transparent film, and the reflective layer, the light blocking layer, and the light diffusion layer may be printed layers that are printed on a rear surface of the transparent film in stated order.

Thus, the reflective layer, the light blocking layer, and the light diffusion layer can be easily disposed on a rear side of display layer.

Moreover, the laminate may further include a transparent film, the reflective layer may be a first printed layer that is printed on a front surface of the transparent film, and the light blocking layer and the light diffusion layer may be second printed layers that are printed on a rear surface of the transparent film in stated order.

Thus, the reflective layer can be easily disposed separately from the light blocking layer and the light diffusion layer.

Moreover, the light diffusion layer may be a film that is light transmissive and diffuses light, and the light blocking layer and the reflective layer may be printed layers that are printed on a front surface of the light diffusion layer in stated order.

Thus, the light blocking layer and the reflective layer can be easily disposed forward of the light diffusion layer.

Moreover, the display layer may include a predetermined colored pattern.

Thus, for example, when the light source is in a non-lighting state, a user can visually recognize only the predetermined colored pattern of the display layer. Moreover, for example, when the light source is in a lighting state, the predetermined design can be displayed in the predetermined colored pattern of the display layer.

Moreover, the predetermined colored pattern may be one of wood grain and a metal pattern.

Thus, for example, when the light source is in the non-lighting state, a user can visually recognize only the wood grain or the metal pattern of the display layer. Moreover, for example, when the light source is in the lighting state, the predetermined design can be displayed in the wood grain or metal pattern of the display layer.

Moreover, the light blocking layer may be black.

Thus, the light blocking layer can block light effectively.

Moreover, the light diffusion layer may have the shape of the predetermined design.

Thus, the size of the light diffusion layer can be reduced and the manufacturing cost can be reduced.

Moreover, the illumination device may further include: a base material that is disposed between the laminate and the light source, and is light transmissive.

This can secure the strength of the laminate.

Moreover, the display layer may include a sliced veneer and a transparent resin impregnated into the sliced veneer. Alternatively, the display layer may be a sliced veneer.

Thus, for example, when the light source is in the non-lighting state, the display layer enables a user to visually recognize only the wood grain of the display layer. Moreover, for example, when the light source is in the lighting state, the predetermined design can be displayed in the wood grain of the display layer.

Moreover, the display layer may include a transparent protective layer included in the front surface.

This can reduce damaging of the front surface of the display layer.

Moreover, an entirety of the first opening overlaps a portion of the second opening.

Thus, even if the reflective layer and the light blocking layer are displaced from each other at the time of manufacture, the first opening can be easily positioned within the second opening in a plan view. This can reduce exposure of the edge portion of second opening through the first opening when the reflective layer is displaced with respect to the light blocking layer. Therefore, this can reduce or prevent the shape of the second opening from being visually recognized without being masked.

Moreover, the light source may be selectively switched to one of a lighting state in which the light source emits light and a non-lighting state in which the light source emits no light.

Thus, when the light source is in the non-lighting state, the predetermined design can be displayed in the pattern of the display layer. When the light source is in the lighting state, the predetermined design can be displayed in the pattern of the display layer.

Hereinafter, an illumination device according to one aspect of the present disclosure is described with reference to the drawings.

Note that the embodiment described below shows a specific example of the present disclosure. Numerical values, shapes, materials, structural components, arrangement and connection configuration of the structural components, steps, and an order of the steps shown in the following embodiment are mere examples, and are not intended to limit the present disclosure. Moreover, among the structural components in the following embodiment, structural components not recited in any of the independent claims defining the broadest concepts of the present disclosure are described as optional structural components.

EMBODIMENT

1. Configuration 1-1. Configuration of Steering Input Device

Figure 1:
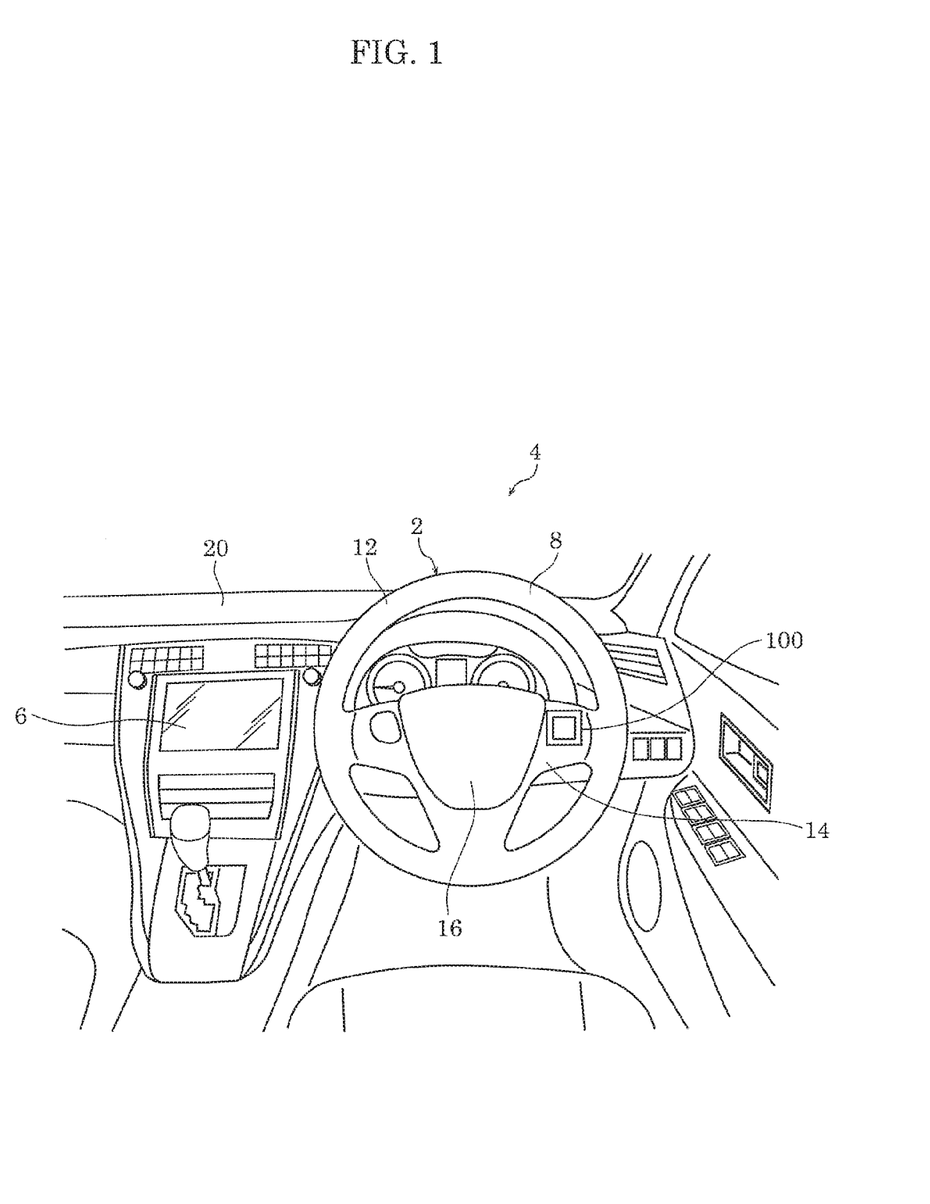
FIG. 1 is a diagram illustrating an example of a passenger compartment of a vehicle equipped with a steering input device according to an embodiment.
Figure 2:
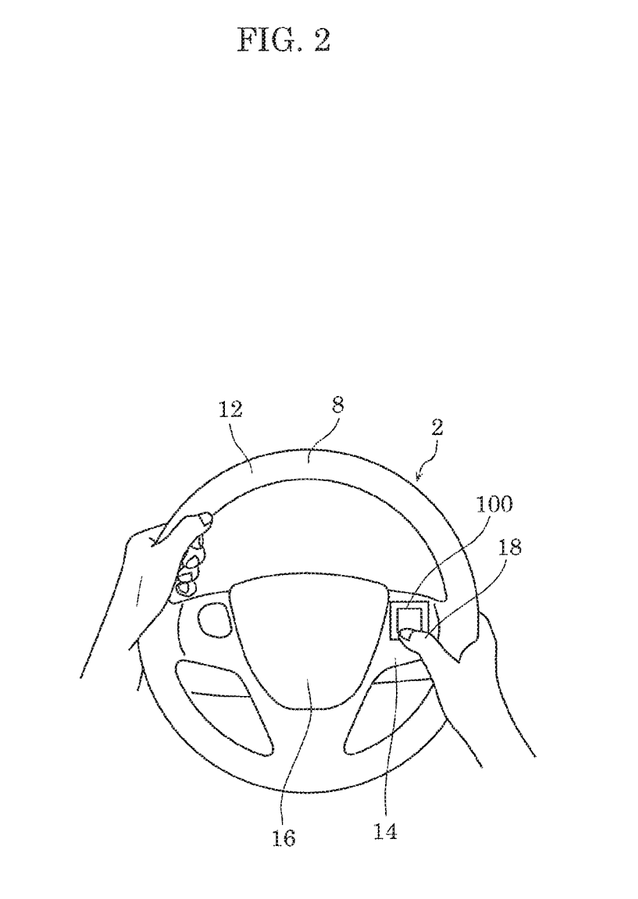
FIG. 2 is a diagram illustrating an example of use of the steering input device according to the embodiment.

First, a configuration of steering input device 2 according to an embodiment is described with reference to FIG. 1 and FIG. 2. FIG. 1 is a diagram illustrating an example of a passenger compartment of a vehicle equipped with steering input device 2 according to an embodiment. FIG. 2 is a diagram illustrating an example of an example of use of steering input device 2 according to the embodiment.

Steering input device 2 and in-vehicle device 6 are equipped in the passenger compartment of automobile 4 (an example of the vehicle) shown in FIG. 1. Steering input device 2 according to the embodiment includes steering wheel 8 and illumination device 100.

Steering wheel 8 is for steering automobile 4. Steering wheel 8 includes rim 12 having a ring shape, spoke 14 having a substantially T-shaped and formed integrally with the inner circumference surface of rim 12, horn switch cover 16 that covers a horn switch (not illustrated) disposed at a central portion of spoke 14.

Illumination device 100 is for operating in-vehicle device 6. For example, illumination device 100 is disposed at spoke 14 of steering wheel 8. As illustrated in FIG. 2, a driver who is a user can operate in-vehicle device 6 by performing an input operation on illumination device 100 with finger 18 (an example of an operating object) of the driver's right hand that grips rim 12. The configuration of illumination device 100 will be described in detail later.

In-vehicle device 6 is, for example, an audio device for playing optical discs, such as a compact disc. In-vehicle device 6 is disposed in dashboard 20, for example. The configuration of in-vehicle device 6 is explained in detail later.

1-2. Configuration of Illumination Device

Figure 3:
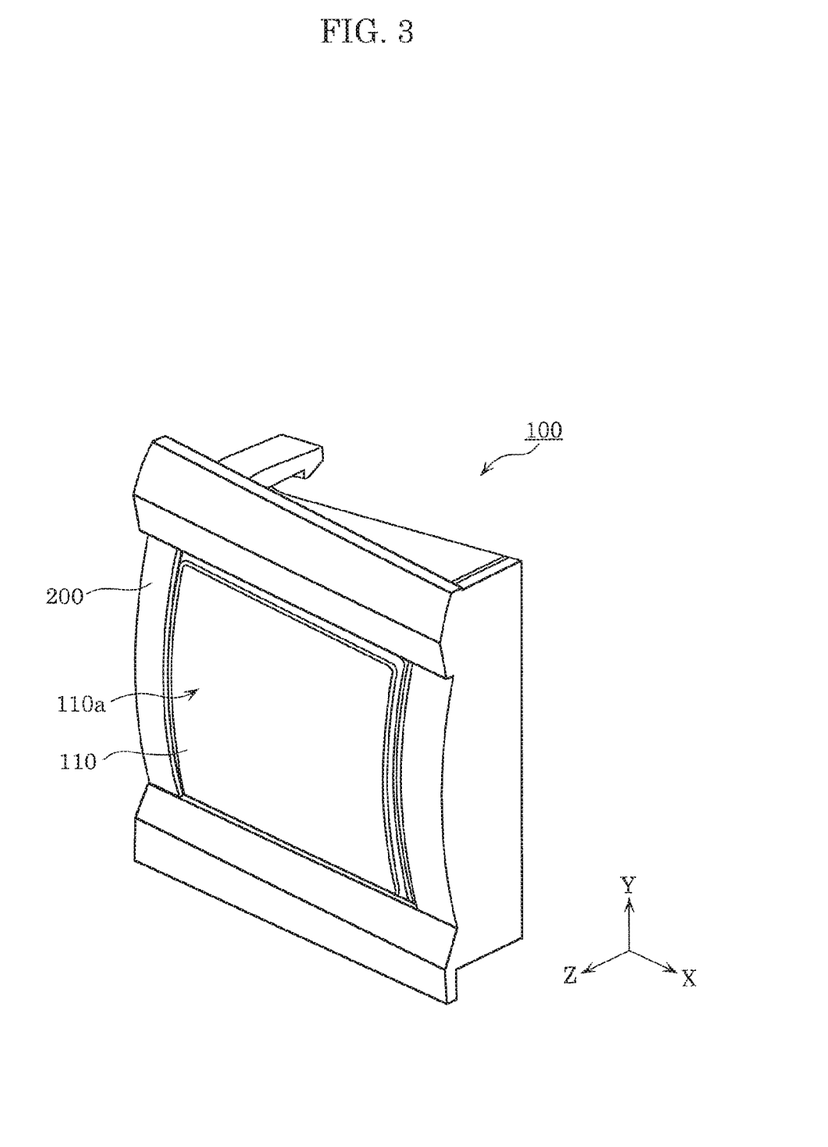
FIG. 3 is an external perspective view of an illumination device according to the embodiment.
Figure 4:
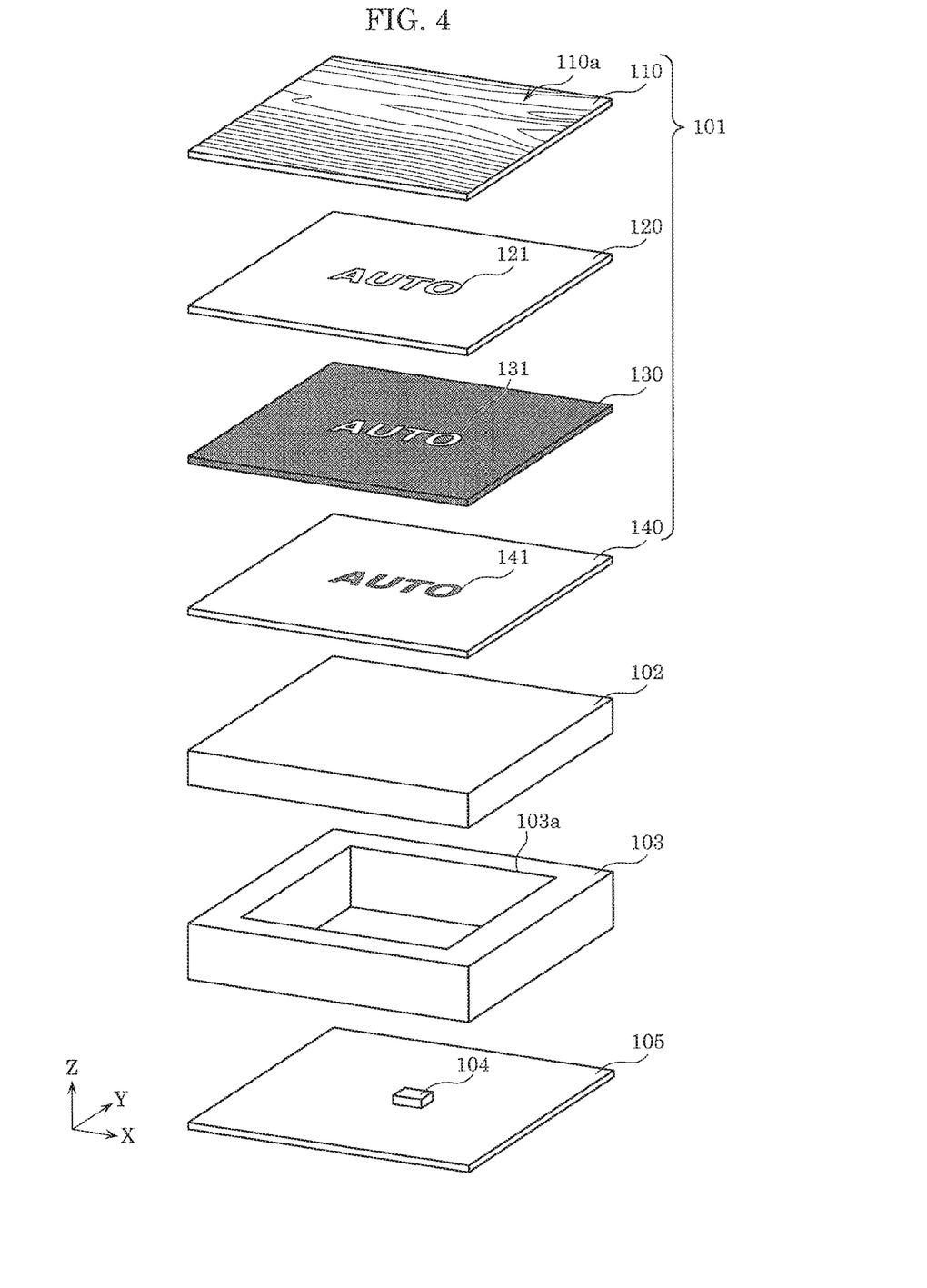
FIG. 4 is an exploded perspective view of an illumination device according to the embodiment.

Next, a configuration of illumination device 100 according to the embodiment is described with reference to FIG. 3 and FIG. 4. FIG. 3 is an external perspective view of illumination device 100 according to the embodiment. FIG. 4 is an exploded perspective view of illumination device 100 according to the embodiment.

In illumination device 100 in FIG. 3, outer frame 200 and display layer 110 are illustrated. In illumination device 100 in FIG. 4, laminate 101, base material 102, case 103, light source 104, and substrate 105 are illustrated. Among these structural components, it is sufficient for illumination device 100 to include laminate 101 and light source 104, and illumination device 100 does not necessarily need to include other structural components.

Laminate 101 includes display layer 110, reflective layer 120, light blocking layer 130, and light diffusion layer 140. Laminate 101 displays a predetermined design on front surface 110a (surface facing the user) by transmitting light emitted by light source 104 forward (a Z-axis positive direction, i.e., a direction opposite to the sight direction of the user) in the shape of the predetermined design. The predetermined design has a shape of the characters "AUTO" in the present embodiment. The details of the predetermined design will be described later with reference to FIG. 5 to FIG. 7.

Display layer 110 includes front surface 110a on which the predetermined design is displayed, and is a light-transmissive layer. Display layer 110 may include, for example, a sliced veneer formed by slicing natural wood, and a transparent resin impregnated into the sliced veneer. Alternatively, display layer 110 may be made of only the above-mentioned sliced veneer. Accordingly, when light source 104 is in a non-lighting state, the wood grain on the front surface of the sliced veneer may be visually recognized by a user as a predetermined colored pattern on front surface 110a of display layer 110.

Note that display layer 110 is not limited to the above configuration, and may be a portion where the predetermined colored pattern is formed on a surface of a light-transmissive resin, for example. The predetermined colored pattern is not limited to such wood grain, and may be a metal pattern i.e., a pattern that is formed by finishing a metal surface, or a pattern of cloth, etc. Examples of the patterns formed by finishing a metal surface include a hairline finish formed by hairline finishing, a satin finish formed by emboss processing. Moreover, a predetermined colored pattern is a predetermined texture.

Moreover, display layer 110 may further include a transparent protective layer (not illustrated) included in front surface 110a. For example, a protective layer is a coating film formed by applying a paint including an acrylic resin, urethane, silicone, etc. to the surface. In other words, the protective layer may be a coating film made of a transparent resin. Accordingly, since front surface 110a of display layer 110 is made of the protective layer, damage to front surface 110a of display layer 110 can be reduced.

Reflective layer 120 is a layer that is disposed between display layer 110 and light source 104, and reflects external light transmitted from front surface 110a of display layer 110 rearward (a Z-axis negative direction, i.e., the sight direction of the user). Specifically, reflective layer 120 is a layer that is adjacent to the rear side of display layer 110. Reflective layer 120 reflects external light with a plane that is in contact with display layer 110, or reflects external light by diffusing the light inside reflective layer 120. Reflective layer 120 is made of an opaque white resin, for example. Moreover, reflective layer 120 includes first opening 121 having the shape of the predetermined design. First opening 121 is a through hole that passes through reflective layer 120 in the thickness direction (a Z-axis direction) of reflective layer 120, and has the shape of the predetermined design. Note that reflective layer 120 is formed by printing an opaque white ink on, for example, display layer 110 or light blocking layer 130, except for first opening 121. Reflective layer 120 that is made of an opaque white resin is formed by printing the opaque white resin. Note that the opaque white ink further includes an adjuvant added to a vehicle resin in which a white pigment that is sufficient to not transmit the color of light blocking layer 130 (for example, black as it will be described later) and sufficient to reflect external light is dispersed. Examples of a white pigment include titanium oxide, calcium carbonate, etc.

Reflective layer 120 is formed by screen printing the opaque white ink onto display layer 110. The thickness of reflective layer 120 here is approximately 5 to 10 micrometers, for example.

Note that the opaque white ink forming reflective layer 120 is not limited to the above composition and materials, and other white pigments or dyes may be used. Moreover, the opaque white ink of reflective layer 120 may be formed by mixing, into a vehicle resin, fine particles (beads made of an acrylic resin) that reflect light, for example. Moreover, the thickness of reflective layer 120 is not limited to 5 to 10 micrometers, and it may have a thickness that is sufficient to not transmit the color of light blocking layer 130 (for example, black as it will be described later).

Light blocking layer 130 is a layer that is disposed between reflective layer 120 and light source 104, and blocks light. Specifically, light blocking layer 130 is a layer that is adjacent to a rear side of reflective layer 120. Light blocking layer 130 is made of a black resin, for example. Moreover, light blocking layer 130 overlaps first opening 121, and includes second opening 131 having the shape of the predetermined design. Second opening 131 is a through hole that passes through light blocking layer 130 in the thickness direction (the Z-axis direction) of light blocking layer 130, and has the shape of the predetermined design. In other words, second opening 131 has the same shape as the shape of first opening 121.

Here, a physical relationship between first opening 121 and second opening 131 in a plan view seen from the Z-axis direction is described with reference to FIG. 5.

Figure 5:
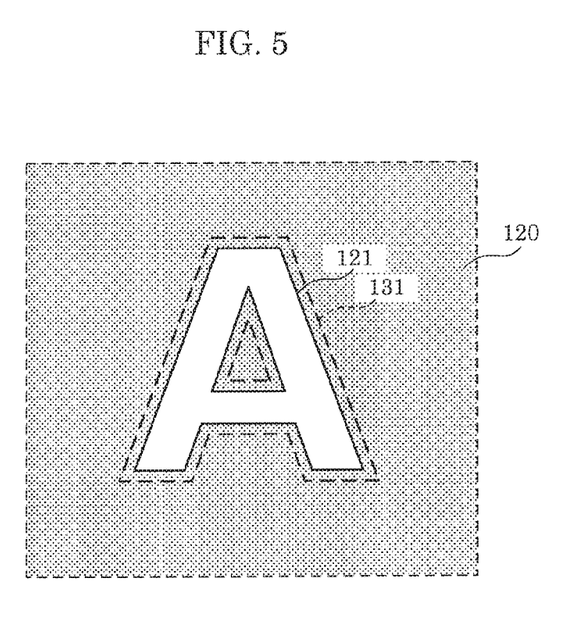
FIG. 5 is a diagram illustrating a positional relationship between a first opening and a second opening in a plan view.

FIG. 5 is a diagram illustrating a positional relationship between first opening 121 and second opening 131 in the plan view.

As illustrated in FIG. 5, the entirety of first opening 121 overlaps a portion of second opening 131. In other words, the size of first opening 121 is smaller than the size of second opening 131, and the region occupied by second opening 131 covers the entire region occupied by first opening 121 in the plan view. Thus, even if reflective layer 120 and light blocking layer 130 are displaced from each other at the time of manufacture, first opening 121 can be easily positioned within second opening 131 in the plan view. This can reduce exposure of the edge portion of second opening 131 through first opening 121 when reflective layer 120 is displaced with respect to light blocking layer 130. Therefore, this can reduce or prevent the shape of second opening 131 from being recognized visually without being masked.

In the present embodiment, light blocking layer 130 is formed by printing a black ink on a plane of reflective layer 120. The black ink is made up of a vehicle resin in which a black pigment for not transmitting light is dispersed. An example of a black pigment includes carbon black.

Light blocking layer 130 is formed by screen printing the black ink onto reflective layer 120. The thickness of light blocking layer 130 here is approximately 5 to 10 micrometers, for example.

Note that the black ink that constitutes light blocking layer 130 is not limited to the above composition and materials, and other black pigments or dyes may be used. Moreover, light blocking layer 130 is not limited to be made of a black ink. Inks of other colors, such as dark colors, may be used as long as light blocking layer 130 does not transmit light. Moreover, the thickness of light blocking layer 130 is not limited to 5 to 10 micrometers, and may be any thickness that is sufficient to block light in portions other than second opening 131 of light blocking layer 130.

Light diffusion layer 140 is a layer that is disposed to overlap second opening 131 between display layer 110 and light source 104, and diffuses light. Specifically, light diffusion layer 140 is a layer that is adjacent to a rear side of light blocking layer 130. Light diffusion layer 140 diffuses light in light diffusion portion 141 which is a portion of light diffusion layer 140, and does not need to diffuse light in portions other than light diffusion portion 141 when seen from the Z-axis direction, for example. Light diffusion portion 141 is formed in the shape of the predetermined design. In other words, light diffusion portion 141 has a shape same as the shapes of first opening 121 and second opening 131. Light diffusion portion 141 is made of an opaque white resin, for example. Moreover, light diffusion portion 141 differs from reflective layer 120 in at least one of reflectance and transmittance.

Specifically, such light diffusion layer 140 is formed, for example, by screen printing an opaque white ink same as the opaque white ink of reflective layer 120 on the surface of light blocking layer 130 so that light is diffused when the light enters through light diffusion layer 140. The thickness of light diffusion layer 140 here is approximately 5 to 10 micrometers, for example. In light diffusion layer 140 thus formed, light diffusion portion 141 is a portion that faces second opening 131. Therefore, since light is blocked by light blocking layer 130 in the portions of light diffusion layer 140 other than light diffusion portion 141, the light diffused by the portions of light diffusion layer 140 other than light diffusion portion 141 does not reach reflective layer 120 and display layer 110.

Note that the opaque white ink is not limited to a composition same as the composition of the ink of reflective layer 120, and may be an ink having a composition or materials different from the opaque white ink of reflective layer 120. Moreover, the opaque white ink of light diffusion layer 140 may be formed by mixing, into a vehicle resin, fine particles (beads made of an acrylic resin, for example) that reflect light, for example. Moreover, the thickness of light diffusion layer 140 is not limited to 5 to 10 micrometers, and may be a thickness that is sufficient to transmit light of light source 140 which will be described later and to reflect external light.

Note that light diffusion layer 140 may be made of only light diffusion portion 141. In other words, light diffusion layer 140 may be formed in a shape of a predetermined design, and does not need to have a portion which does not diffuse light. Thus, the size of light diffusion layer 140 can be reduced, and light diffusion layer 140 can be formed using fewer materials.

Note that reflective layer 120 may be formed by being printed on the rear surface of display layer 110. Moreover, light blocking layer 130 may be formed by being printed on the rear surface of reflective layer 120. Moreover, light diffusion layer 140 may be formed by being printed on the rear surface of light blocking layer 130. In other words, reflective layer 120, light blocking layer 130, and light diffusion layer 140 are printed layers that are printed on the rear surface of display layer 110 in stated order. Thus, reflective layer 120, light blocking layer 130, and light diffusion layer 140 may be easily disposed on the rear surface of display layer 110. Since reflective layer 120, light blocking layer 130, and light diffusion layer 140 are printed layers, they may be made of a solidified ink.

Base material 102 is a component that is disposed between laminate 101 and light source 104, and is light transmissive. Substrate 102 is a plate member that is adjacent to the rear side of laminate 101. Base material 102 is made of a material having a greater rigidity than the rigidity of laminate 101. Accordingly, base material 102 can reduce bending of the front surface of laminate 101 when a load is applied to the front surface of laminate 101, and the strength of laminate 101 can be secured. Base material 102 is made of a transparent resin, for example.

Case 103 is a component that is disposed between base material 102 and substrate 105, and surrounds side portions of light source 104 disposed on the front surface of substrate 105. Case 103 includes through hole 103a that passes through in the Z-axis direction. Case 103 is a component that is adjacent to the rear side of base material 102, and adjacent to a front side of substrate 105. In other words, case 103 is a component for leaving a predetermined space between base material 102 and substrate 105 in the Z-axis direction. Case 103 is made of a resin, for example. The material of case 103 is not limited to a resin. Case 103 may be made of metal.

Light source 104 is disposed on the front surface of substrate 105, and is disposed in a space inside through hole 103a of case 103. Light source 104 emits light to the Z-axis positive direction. Light source 104 is a light emitting diode (LED), for example. Light source 104 may be disposed in a position that overlaps second opening 131, when seen from the Z-axis direction. Light source 104 is connected to a power line, which is not illustrated, in substrate 105, and electric power may be supplied. Light source 104 is in a lighting state in which light source 104 emits light when electric power is supplied, and is in a non-lighting state in which light source 104 does not emit light when electric power is not supplied. Supplying and not supplying electric power to light source 104 may be switched by truing ON/OFF a switch which is not illustrated, and may also be switched by being controlled by a control circuit which is not illustrated. Accordingly, light source 140 is selectively switched to one of the lighting state and the non-lighting state.

Next, display modes of predetermined design 106 when light source 104 is in the non-lighting state and the lighting state and the principles of the display modes are described with reference to FIG. 6 to FIG. 9.

Figure 6:
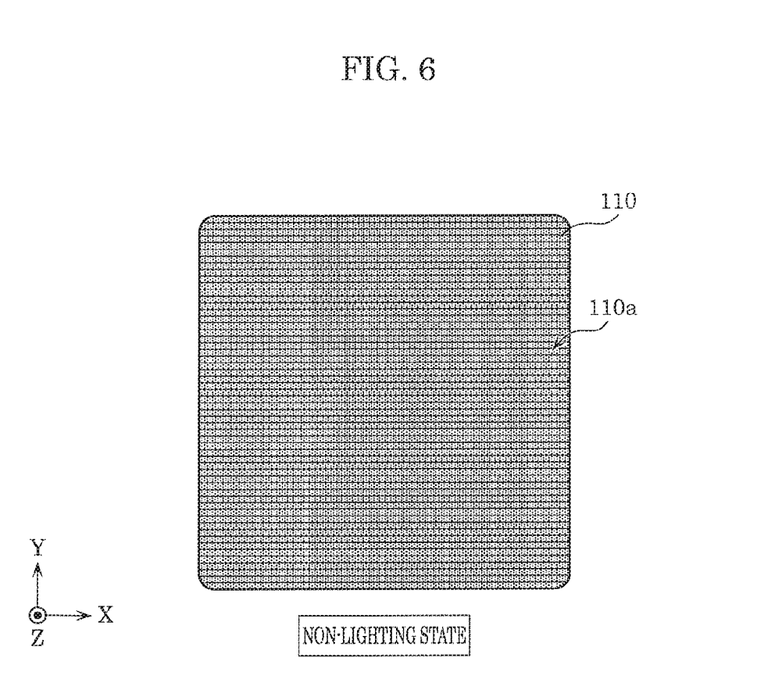
FIG. 6 is an example of a display mode of a predetermined design when a light source is in a non-lighting state.
Figure 7:
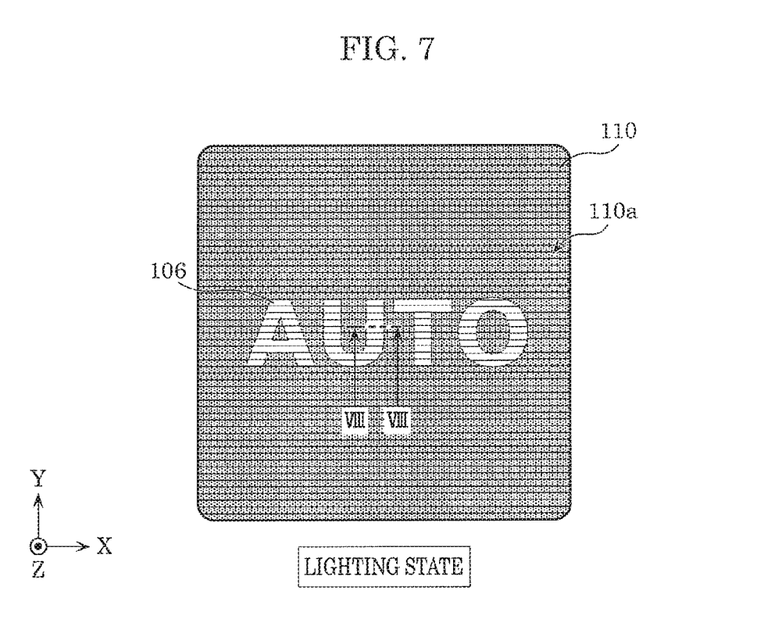
FIG. 7 is an example of a display mode of the predetermined design when the light source is in a lighting state.
Figure 8:
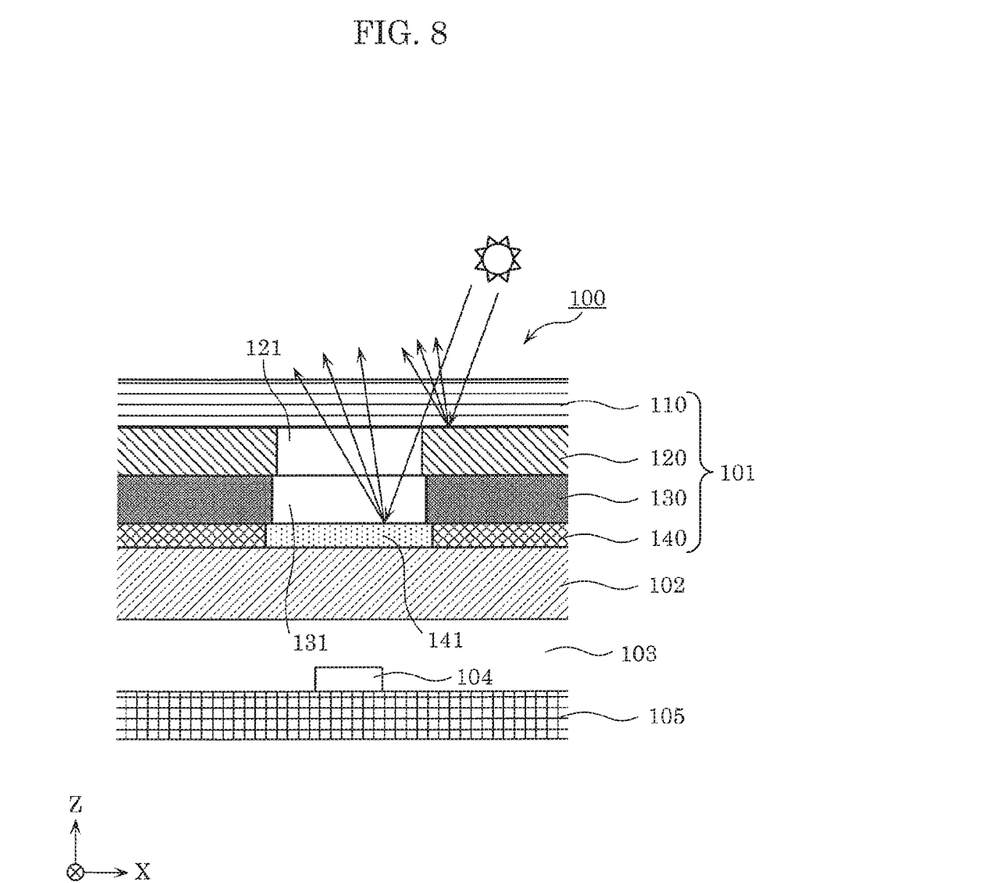
FIG. 8 is a cross-sectional view taken along line VIII-VIII in FIG. 7 for describing the principle of the display mode of the non-lighting state.
Figure 9:
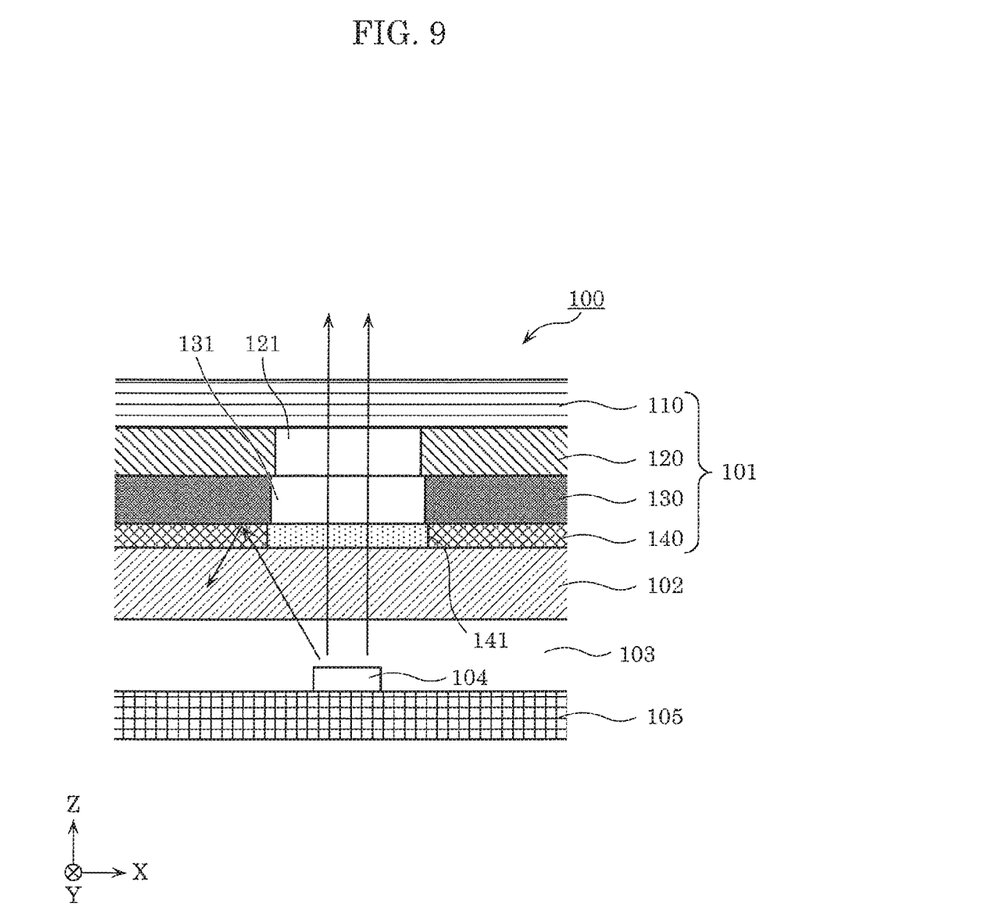
FIG. 9 is a cross-sectional view taken along line VIII-VIII in FIG. 7 for describing the principle of the display mode of the lighting state.

FIG. 6 is an example of a display mode of predetermined design 106 when light source 104 is in the non-lighting state. FIG. 7 is an example of a display mode of predetermined design 106 when light source 104 is in the lighting state. FIG. 8 is a cross-sectional view taken along line VIII-VIII in FIG. 7 for describing the principle of the display mode in the non-lighting state. FIG. 9 is a cross-sectional view taken along line VIII-VIII in FIG. 7 for describing the principle of the display mode in the lighting state.

As illustrated in FIG. 6, since predetermined design 106 is not displayed when light source 104 is in the non-lighting state, a user can visually recognize only the pattern of the wood grain on front surface 110a of display layer 110. Its principle will be described with reference to FIG. 8.

As illustrated in FIG. 8, in the non-lighting state, external light such as sunlight passes rearward through display layer 110 from front surface 110a, and is reflected forward by reflective layer 120. Moreover, external light is diffused by light diffusion portion 141 of light diffusion layer 140, and the diffused light is reflected forward. In particular, since the all of the front side of light blocking layer 130 that is black is covered with reflective layer 120, the external light that has passed through display layer 110 from front surface 110a does not easily reach light blocking layer 130. Note that the external light is not limited to sunlight, and may include various types of light incident from the front side of illumination device 100 on front surface 110a.

Moreover, since light diffusion portion 141 of light diffusion layer 140 is disposed in the region in which second opening 131 of light blocking layer 130 is formed, the external light that has passed through display layer 110 from front surface 110a is reflected forward by light diffusion portion 141. Accordingly, the external light that has passed through display layer 110 from front surface 110a is reflected forward in all of the regions in X-Y plane of illumination device 100 and does not easily reach light blocking layer 130. Thus, the shape of second opening 131 of light blocking layer 130 does not appear on front surface 110a. Therefore, a user can visually recognize only the pattern of the wood grain on front surface 110a in the non-lighting state.

On the other hand, as illustrated in FIG. 7, since predetermined design 106 is displayed on front surface 110a of display layer 110 with light from light source 104 when light source 104 is in the lighting state, a user can visually recognize predetermined design 106 in the pattern of the wood grain on front surface 110a. Its principle will be described with reference to FIG. 9.

As illustrated in FIG. 9, in the lighting state, the light emitted from light source 104 passes through base material 102 and then is diffused by light diffusion portion 141 of light diffusion layer 140. Then, the light diffused by light diffusion portion 141 passes through second opening 131 of light blocking layer 130 and first opening 121 of reflective layer 120. Subsequently, the light passes through display layer 110 and travels forward of front surface 110a. On the other hand, the light diffused in light diffusion portion 141 is blocked in regions of light blocking layer 130 except for second opening 131. Thus, the light does not reach forward of front surface 110a of display layer 110. Thus, a user can visually recognize predetermined design 106 in the wood grain on front surface 110a in the lighting state.

2. Effects, Etc.

In illumination device 100 according to the present embodiment, reflective layer 120 that reflects external light, and light diffusion layer 140 that diffuses light are provided separately, and first opening 121 is disposed to overlap light diffusion portion 141 of light diffusion layer 140 is provided on reflective layer 120. Therefore, adjusting the reflectance of reflective layer 120 enables adjustment of the degree of masking the shape of second opening 131 of light blocking layer 130 appearing on front surface 110a of display layer 110 when light source 104 does not emit light. Furthermore, the display luminance of predetermined design 106 can be adjusted by adjusting the transmittance of light diffusion portion 141 of light diffusion layer 140. As described above, since the configurations of reflective layer 120 and light diffusion layer 140 are separate, the degree of masking the shape of second opening 131 and the display luminance of predetermined design 106 can be adjusted independently. Accordingly, masking and displaying predetermined design 106 can be balanced effectively.

Moreover, in illumination device 100 according to the present embodiment, display layer 110 includes a predetermined colored pattern. Moreover, the predetermined colored pattern is one of wood grain and a metal pattern. Thus, when light source 104 is in the non-lighting state, a user can visually recognize only the wood grain or the metal pattern of display layer 110. Moreover, when light source 104 is in the lighting state, predetermined design 106 can be displayed in the wood grain or the metal pattern of display layer 110.

Moreover, in illumination device 100 according to the present embodiment, light blocking layer 130 is black. Thus, light blocking layer 130 can block light effectively.

3. Variation 3-1. Variation 1

Illumination device 100A of Variation 1 will be described with reference to FIG. 10.

Figure 10:
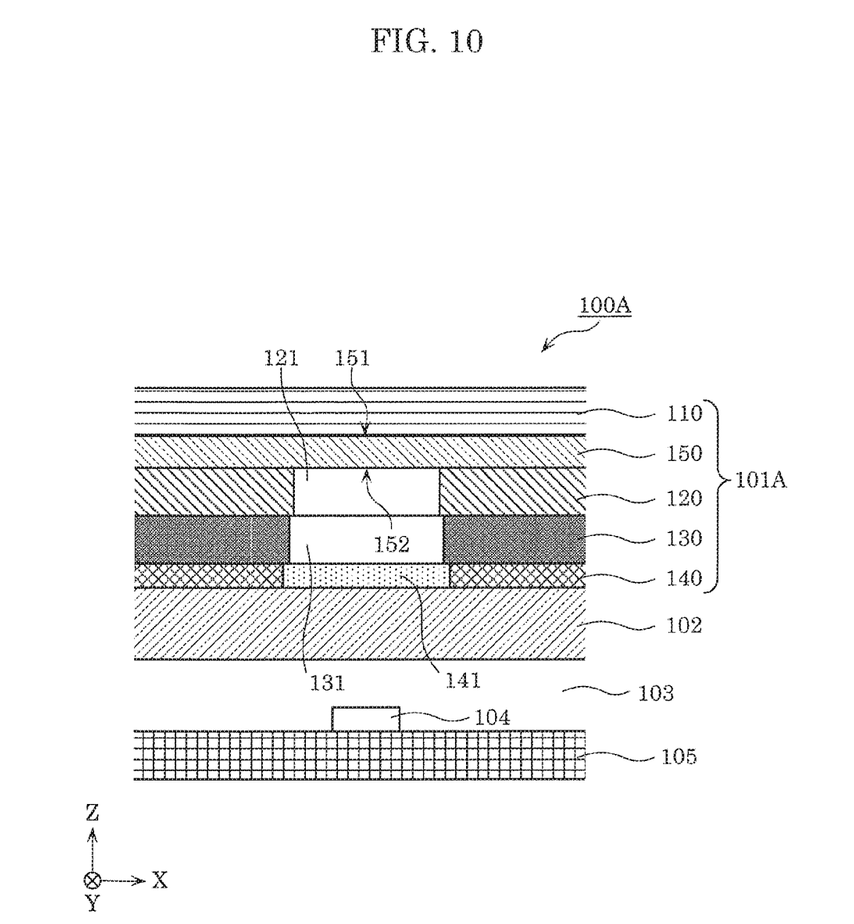
FIG. 10 is a cross-sectional view of an illumination device according to Variation 1 corresponding to the cross-sectional view taken along line VIII-VIII in FIG. 7.

FIG. 10 is a cross-sectional view of illumination device 100A according to Variation 1 corresponding to the cross-sectional view taken along line VIII-VIII in FIG. 7.

As illustrated in FIG. 10, illumination device 100A according to Variation 1 differs from illumination device 100 according to the embodiment in that laminate 101A further includes transparent film 150. Therefore, in the following, laminate 101A will be described and description of other configurations will be omitted.

Laminate 101A includes display layer 110, transparent film 150, reflective layer 120, light blocking layer 130, and light diffusion layer 140. The configurations of display layer 110, reflective layer 120, light blocking layer 130, and light diffusion layer 140 are the same as the configurations of those components in the embodiment. Transparent film 150 is a transparent film sheet. Transparent film 150 is made of an acrylic resin or polycarbonate resin having a thickness of 50 to 200 micrometers, for example. Note that the material of transparent film 150 is not limited to an acrylic resin or polycarbonate resin, and may be any material as long as the material is a film of a transparent material. Moreover, the thickness of transparent film 150 is not limited to the above, and may be appropriately changed according to transparency or the ease of handling.

Display layer 110 is disposed on front surface 151 of transparent film 150. Moreover, reflective layer 120, light blocking layer 130, and light diffusion layer 140 are printed layers that are printed on rear surface 152 of transparent film 150 in stated order. Since reflective layer 120, light blocking layer 130, and light diffusion layer 140 are printed layers as in the embodiment, they may be made of a solidified ink.

In illumination device 100A of Variation 1, the layers on the rear side of display layer 110 of laminate 101A are printed on transparent film 150. Thus, reflective layer 120, light blocking layer 130, and light diffusion layer 140 can be easily disposed on the rear side of display layer 110.

3-2. Variation 2

Illumination device 100B of Variation 2 will be described with reference to FIG. 11.

Figure 11:
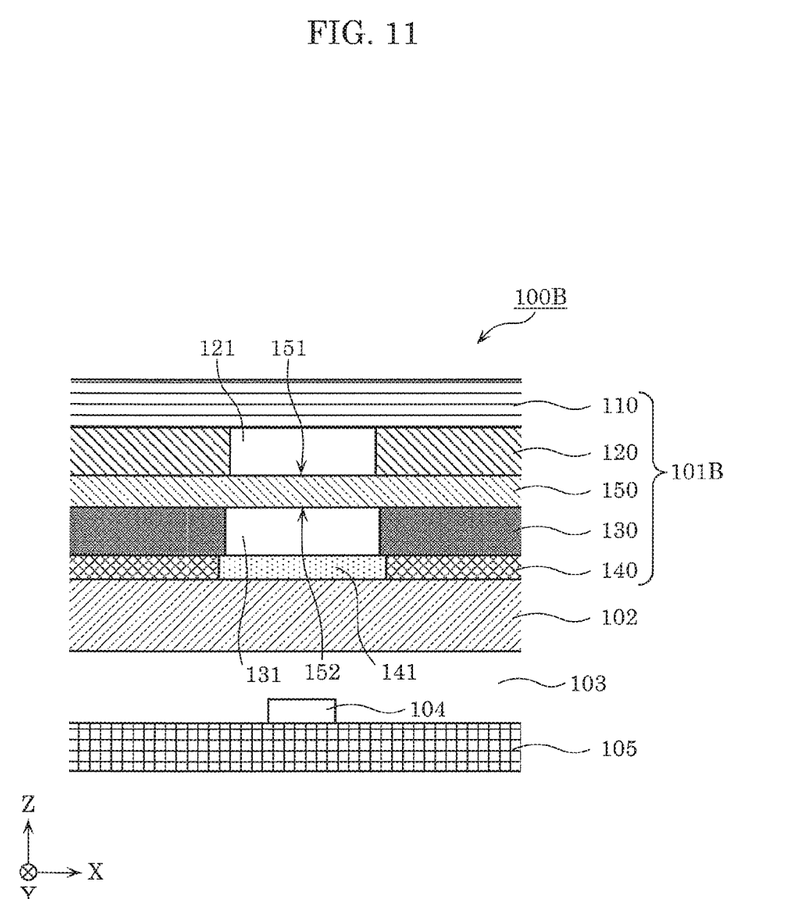
FIG. 11 is a cross-sectional view of an illumination device according to Variation 2 corresponding to the cross-sectional view taken along line VIII-VIII in FIG. 7.

FIG. 11 is a cross-sectional view of illumination device 100B according to Variation 2 corresponding to the cross-sectional view taken along line VIII-VIII in FIG. 7.

As illustrated in FIG. 11, illumination device 100B according to Variation 2 is same as illumination device 100A according to Variation 1 in that laminate 101B includes transparent film 150. However, illumination device 100B according to Variation 2 differs in that transparent film 150 is disposed between reflective layer 120 and light blocking layer 130 in laminate 101B. Specifically, reflective layer 120 is a first printed layer formed by being printed on front surface 151 of transparent film 150. Moreover, light blocking layer 130 and light diffusion layer 140 are second printed layers that are printed on rear surface 152 of transparent film 150 in stated order. Since reflective layer 120, light blocking layer 130, and light diffusion layer 140 are printed layers as in the embodiment, they may be made of a solidified ink.

In illumination device 100B according to Variation 2, reflective layer 120 can be easily disposed separately from light blocking layer 130, and light diffusion layer 140 by disposing transparent film 150.

3-3. Variation 3

In illumination device 100 according to the embodiment described above, light diffusion layer 140 is a printed layer that is formed by printing, but is not limited to the printed layer. Light diffusion layer 140 may be made of a film that is light transmissive and diffuses light. In this case, reflective layer 120 and light blocking layer 130 may be printed layers that are printed in stated order on the front surface of light diffusion layer 140 that is made of a film. Accordingly, reflective layer 120 and light blocking layer 130 can be easily disposed forward of light diffusion layer 140.

Note that the thickness of the film is the same as the thickness of transparent film 150 described above.

Similarly, reflective layer 120 and light blocking layer 130 each may be made of a film instead of a printed layer. In this case, reflective layer 120 is formed such that first opening 121 is light transmissive and the other portions diffuse light. Moreover, light blocking layer 130 is formed such that second opening 131 is light transmissive and the other portions block light. Display layer 110, reflective layer 120, light blocking layer 130, and light diffusion layer 140 may be integrated together by laminating and attaching them in stated order to form laminate 101.

Therefore, at least one of reflective layer 120, light blocking layer 130, or light diffusion layer 140 may be made of a film.

3-4. Variation 4

In illumination devices 100, 100A, and 100B according to the above embodiment and its Variations 1 to 3, light diffusion layer 140 diffuses light in light diffusion portion 141. However, the present disclosure is not limited to this configuration. Light diffusion layer 140 may be a layer whose entire region diffuses light. Accordingly, the manufacturing process for forming light diffusion layer 140 can be simplified.

3-5. Variation 5

Although light diffusion layer 140 is disposed on the rear side of light blocking layer 130 in illumination devices 100, 100A, and 100B according to the above embodiment and its Variations 1 to 4, light diffusion layer 140 may be disposed at any position as long as light diffusion layer 140 is disposed between reflective layer 120 and light source 104.

While the display device and input device according to one or more aspects of the present disclosure have been described above based on the embodiment, the present disclosure is not limited to the embodiment. The one or more aspects of the present disclosure may include configurations obtained by various modifications to the aforementioned embodiment that can be conceived by a person skilled in the art, as well as configurations structured by optionally combining structural components in different embodiments, as long as these do not depart from the scope of the present disclosure.

While an embodiment has been described herein above, it is to be appreciated that various changes in form and detail may be made without departing from the spirit and scope of the present disclosure as presently or hereafter claimed.

FURTHER INFORMATION ABOUT TECHNICAL BACKGROUND TO THIS APPLICATION

The disclosures of the following Japanese Patent Applications including specification, drawings and claims are incorporated herein by references on their entirety: Japanese Patent Application No. 2018-238665 filed on Dec. 20, 2018 and Japanese Patent Application No. 2019-081750 filed on Apr. 23, 2019.

INDUSTRIAL APPLICABILITY

The present disclosure is useful as an illumination device, etc. capable of effectively balancing masking and displaying of the design.

What is claimed is:

1. An illumination device, comprising:
a light source; and
a laminate that displays a predetermined design on a front surface by transmitting light emitted by the light source forward in a shape of the predetermined design, wherein
the laminate includes:
   a display layer that includes the front surface and is light transmissive;
   a reflective layer that includes a first opening having the shape of the predetermined design, is disposed between the display layer and the light source, and reflects external light transmitted from the front surface of the display layer rearward;
   a light blocking layer that includes a second opening having the shape of the predetermined design and overlapping the first opening, is disposed between the reflective layer and the light source, and blocks light; and
   a light diffusion layer that diffuses light and is disposed between the reflective layer and the light source to overlap the second opening.

2. The illumination device according to claim 1, wherein the reflective layer, the light blocking layer, and the light diffusion layer are printed layers that are printed on a rear surface of the display layer in stated order.

3. The illumination device according to claim 1, wherein the laminate further includes a transparent film,
the display layer is disposed on a front surface of the transparent film, and
the reflective layer, the light blocking layer, and the light diffusion layer are printed layers that are printed on a rear surface of the transparent film in stated order.

4. The illumination device according to claim 1, wherein the laminate further includes a transparent film,
the reflective layer is a first printed layer that is printed on a front surface of the transparent film, and
the light blocking layer and the light diffusion layer are second printed layers that are printed on a rear surface of the transparent film in stated order.

5. The illumination device according to claim 1, wherein the light diffusion layer is a film that is light transmissive and diffuses light, and
the light blocking layer and the reflective layer are printed layers that are printed on a front surface of the light diffusion layer in stated order.

6. The illumination device according to claim 1, wherein the display layer includes a predetermined colored pattern.

7. The illumination device according to claim 6, wherein the predetermined colored pattern is one of wood grain and a metal pattern.

8. The illumination device according to claim 1, wherein the light blocking layer is black.

9. The illumination device according to claim 1, wherein the light diffusion layer has the shape of the predetermined design.

10. The illumination device according to claim 1, further comprising:
a base material that is disposed between the laminate and the light source, and is light transmissive.

11. The illumination device according to claim 1, wherein the display layer includes a sliced veneer and a transparent resin impregnated into the sliced veneer.

12. The illumination device according to claim 1, wherein the display layer is a sliced veneer.

13. The illumination device according to claim 1, wherein the display layer includes a transparent protective layer included in the front surface.

14. The illumination device according to claim 1, wherein an entirety of the first opening overlaps a portion of the second opening.

15. The illumination device according to claim 1, wherein the light source is selectively switched to one of a lighting state in which the light source emits light and a non-lighting state in which the light source emits no light.

* * * * *